(12) United States Patent
Fantini (10) Patent No.: US 9,803,321 B2
(45) Date of Patent: Oct. 31, 2017

(54) FIBRE-BASED SUPPORT CONTAINING A LAYER OF A FUNCTIONALIZED WATERSOLUBLE POLYMER, METHOD OF PRODUCTION AND USE THEREOF

(75) Inventor: Diego Fantini, Pont-Evêque (FR)

(73) Assignee: MUNKSJÖ OYJ, Helsinki (FI)

( * ) Notice: Subject to any disclaimer, the term of this patent is extended or adjusted under 35 U.S.C. 154(b) by 25 days.

(21) Appl. No.: 14/235,939

(22) PCT Filed: Jul. 20, 2012

(86) PCT No.: PCT/FI2012/050744
§ 371 (c)(1),
(2), (4) Date: Jun. 2, 2014

(87) PCT Pub. No.: WO2013/017731
PCT Pub. Date: Feb. 7, 2013

(65) Prior Publication Data
US 2014/0262092 A1    Sep. 18, 2014

(30) Foreign Application Priority Data

Jul. 29, 2011 (EP) ..................... 11175889

(51) Int. Cl.
*D21H 19/12* (2006.01)
*D21H 27/00* (2006.01)
(Continued)

(52) U.S. Cl.
CPC ........... *D21H 19/12* (2013.01); *D21H 19/10* (2013.01); *D21H 27/001* (2013.01); *D21H 27/002* (2013.01); *D21H 27/06* (2013.01)

(58) Field of Classification Search
USPC ...... 162/164.1, 164.3, 164.6, 16, 8.1, 168.2, 162/157.1–157.7; 427/358, 361;
(Continued)

(56) References Cited

U.S. PATENT DOCUMENTS 2,668,156 A    2/1954  Caldwell et al.
3,162,543 A   12/1964  Wilkins
(Continued)

FOREIGN PATENT DOCUMENTS

CN    1968975    5/2007
CN   101238158   8/2008
(Continued)

OTHER PUBLICATIONS

Lee et al, "Epoxide-Alcohol Reaction Catalyzed by Boron Trifluoride. Part I. Phenyl Glycidyl Ether-Alcohol Reaction in Dioxane", J. Polymer Science, Part A, v. 3, pp. 2955, 2956 and 2962, [online], retrieved from the Internet, [retrieved Mar. 8, 2017, <URL:http://onlinelibrary.wiley.com/doi/10.1002/pol.1965.100030822/epdf>.*
(Continued)

*Primary Examiner* — Dennis Cordray
(74) *Attorney, Agent, or Firm* — Nixon & Vanderhye P.C.

(57) ABSTRACT

A cellulose and/or synthetic fiber-based support of which at least one surface is coated with a layer containing at least one water-soluble polymer comprising hydroxyl or primary-secondary amino functional groups, at least some of which have been functionalized beforehand with at least one organic compound comprising at least one epoxy functional group, and at least one $R^1$ group wherein $R^1$ is a vinyl functional group or at least one $Si(R^2)3$ functional group and wherein $R^2$=hydrogen atom, hydroxyl, alkoxy, alkyl, and combinations thereof.

6 Claims, 1 Drawing Sheet

(51) Int. Cl.
*D21H 27/06* (2006.01)
*D21H 19/10* (2006.01)

(58) Field of Classification Search
USPC .......................................... 428/340, 342, 511
See application file for complete search history.

(56) References Cited

U.S. PATENT DOCUMENTS

| | | |
|---|---|---|
| 4,002,796 A | 1/1977 | Baldi et al. |
| 6,379,499 B1 | 4/2002 | Yang et al. |
| 2004/0221975 A1 | 11/2004 | Hernandez-Munoa et al. |
| 2007/0004859 A1 | 1/2007 | Bacher et al. |
| 2007/0054068 A1 | 3/2007 | Kimpimäki et al. |
| 2009/0227718 A1 | 9/2009 | Tanimoto et al. |
| 2012/0183771 A1 | 7/2012 | Fantini |

FOREIGN PATENT DOCUMENTS

| | | |
|---|---|---|
| CN | 101100811 | 9/2010 |
| EP | 0525598 | 2/1993 |
| WO | WO 99/08784 | 2/1999 |
| WO | WO 2004/101887 | 11/2004 |
| WO | WO2005/071161 | 8/2005 |
| WO | WO 2005/071161 | 8/2005 |
| WO | WO2009/147283 | 12/2009 |
| WO | WO 2009/147283 | 12/2009 |

OTHER PUBLICATIONS

Chinese First Office Action in Application 201280037771.7 dated Mar. 30, 2015.
Chinese Search Report in Application 201280037771.7 dated Mar. 30, 2015.
Annex to Opposition against EP 2 551 406, dated Jul. 13, 2015 Test report related to examples in the European patent No. 2551 406.
Dow Corning fact sheet from 2003 (downloaded from http://www.dowcorning.com/content/publishedlit/30-1053-01.pdf on Jun. 10, 2015.
International Search Report for PCT/FI2012/050744 mailed Dec. 27, 2012.
Search Report for EP 11 17 5889 dated Jun. 20, 2012.

* cited by examiner

FIBRE-BASED SUPPORT CONTAINING A LAYER OF A FUNCTIONALIZED WATERSOLUBLE POLYMER, METHOD OF PRODUCTION AND USE THEREOF

This application is the U.S. national phase of International Application No. PCT/FI2012/050744 filed 20 Jul. 2012 which designated the U.S. and claims priority to EP 11175889.2 filed 29 Jul. 2011, the entire contents of each of which are hereby incorporated by reference.

FIELD OF THE INVENTION

The invention relates to a novel functionalized support based on cellulose and/or synthetic fibres, and to the production method thereof.

One of the main areas of application of the present invention relates to supports that are intended for siliconizing for all self-adhesive products, such as pressure sensitive labels or adhesive tape, for the envelope industry, weight/price equipment, feminine hygiene products or graphic applications, for vegetable parchment and greaseproof products representing a non-limiting selection of applications.

SURVEY OF THE RELATED ART

Supports that are to be siliconized must possess certain properties which are defined in advance according to the final application for which they are intended. For instance, in release liner which is one of the most important applications, one or two sides of the support are coated with a silicone film i.e. a release agent. The release agent provides a release effect regarding any type of sticky materials such as an adhesive, a mastic or dietary pasty (pizza dough for instance). Thus, once they have been siliconized, such supports must guarantee two primary functionalities: they must protect the self-adhesive products before they are used and they must be capable of a perfect adhesive transfer upon removal.

These supports generally consist of a cellulose and/or synthetic fibre based substrate coated with a layer of water-soluble binding agents, latexes and pigments. They can be produced by many techniques including coating, size-press or metering-size-press. One skilled in the art is quite familiar with these coating methods which can also be followed by a calendering or supercalendering step.

The main properties required when manufacturing such cellulose and/or synthetic fibre fibre-based supports include mechanical strength, silicone anchorage, silicone hold-out and transparency.

Depending on the market that is particularly being targeted, more or less emphasis may be placed on the transparency of the support. For example, the weight/price market requires supports that are more transparent than the market for envelopes.

The silicone hold-out must provide a good surface coverage and must afford a uniform protection. This objective is generally achieved with a quantity of silicone in the range of 0.5 to 2 g/m². It is important to limit the quantity of silicone applied without loss of its coverage capabilities, in order to avoid uneconomical wastages of silicone and consequent additional costs. Actually, the silicone price has a significant impact on the total cost of the final products due to the relative high price of the silicone formulation as raw material. Moreover, the catalyst used in the cross-linking reaction of silicone accounts for a large part of the overall cost of the silicone formulation. For instance, in the most part of silicone systems, the platinum that is used as catalyst cannot be recovered after completion of the reaction.

The cost and the reactivity of the silicones require that the support, on which they are applied, fulfils a certain number of criteria. First of all, the chemical structure of the support must not prevent the silicone system from cross-linking; i.e.—in the case of the platinum based silicone systems—the polyaddition reaction between the vinylic functional groups of the silicone resin and the hydrogen siloxane functional groups of the silicone cross-linking agent should not be impacted. In other words, the support must not inhibit the crosslinking reaction of the silicone. Next, the support has to provide a perfect anchorage of the silicone to the surface thereof. Furthermore, considering the high cost of silicone, it is important that the amount of silicone deposited on the support is as low as possible. To do this, the support has to form a barrier and thus limit as much as possible the penetration of the silicone inside the support. Likewise, the surface of the support has to be as regular and as smooth as possible in order to permit a homogenous application of the silicone.

In other words, the first problem concerns the development of a support that allows simultaneously an efficient anchorage and an optimal cross-linking of the silicone while still reducing as much as possible the silicone penetration inside the support.

The siliconizing step does not only depend on the support but also on the silicone and the cross-linking agent used. The siliconizing methods are defined according to the silicone cross-linking mode, and these are divided into two categories, the first being silicones that are cross-linked under UV radiation or electron beams, and the second being "thermal cross-linking" silicones. Since the first category is less exploitable from both the technical and financial points of view, thermally cross-linked silicones account for the larger market.

Silicones are thermally cross-linked by passing the support, coated in silicone beforehand, through a kiln. The kiln temperature must be such that the surface of the support reaches the temperature at which the silicone cross-linking reaction takes place. In order to enable the cross-linking reaction at a lower temperature, special silicones have been developed. They are referred to as "LTC silicones" (low temperature curing). Recently, new silicone systems have been commercialized: fast curing silicone systems, the peculiarity of such a type of silicones is the fact that the cross-linking reaction takes place properly in the presence of a lower amount of catalyst (i.e.: Platinum). In the field of self-adhesives, the term of "curing" refers to the cross-linking reaction of silicone. The temperatures at which cross-linking occurs with LTC silicones ranges from 60 to 100° C. rather than 110 to 150° C. for conventional silicones. However, up to now the main disadvantage of using LTC silicones has concerned the fact that the cross-linked silicone presented a very poor anchorage on the support. This anchorage deficiency of LTC silicones therefore limits their use on a large industrial scale.

In the case of release liner applications, there are four main types of support that can be siliconized, these being "coated" papers, vegetable parchment, glassine and greaseproof paper.

"Coated" papers, so called CCK (Clay Coated Kraft), are obtained by depositing on a cellulose and/or synthetic fibre-based support at least one coated layer of a mixture containing pigments (clay, calcium carbonate for example) and binders (starch, polyvinyl alcohol, latex). In order to obtain a satisfactory silicone hold-out, the coated layer is applied in a quantity of 5 to 20 g/m². The coated support is then calendered. In general, coated papers are designed particularly for applications related to envelopes, office labels, hygiene, and graphic applications.

Vegetable parchment paper is a paper made by passing a waterleaf sheet (unsized paper with a low water resistance), made from chemical wood pulp through a bath of sulfuric acid, or (at times) zinc chloride, under established conditions of time, temperature, and the like. The treated paper is then washed thoroughly so as to remove the acid or zinc salt, after which it is dried. The chemicals partially dissolve or gelatinize the cellulose structure of the paper, which is then regenerated when the chemical is diluted by the washing. This forms a very tough, stiff paper with an appearance somewhat like that of a genuine parchment. Because paper treated in this manner has a tendency to become brittle and to wrinkle upon drying, it is frequently treated with a plasticizing agent, usually glycerine or glucose.

Such vegetable parchment can be then coated with silicone (generally water based silicone system), either on one side, or on both side. Silicone coating can occur either on the parchmentizing line, or on an off-line coater, to produce vegetable parchment for release applications. Due to the fact that such a tipe of paper is resistant against heat and since other substances do not stick onto it, this paper can be used in a variety of applications in packing, storage and restoration, in composite industry, in dry mounting presses, and as slip sheets for printing.

Glassine is a more refined support than clay coated paper. The process by which it is manufactured differs also in the method used to form the coating. In fact, the film is formed in a size-press or metering size-press coating process and in the final step calendering is replaced by supercalendering. As a result, the product obtained is denser. It also has greater mechanical resistance and transparency than clay coated paper. Glassine is less dimensionally stable than clay coated paper. The mixture used to coat the cellulose support is composed primarily of water-soluble binders having a film-forming nature (such as starch, polyvinyl alcohol (PVA) and carboxymethyl cellulose (CMC)), and often of a viscosifying agent and some additives. The weight of the coating is in the order of 0.5 to 2 g/m² on each surfaces.

Greaseproof paper is similar to glassine in term of machine process, except that the silicone layer may be applied on paper machine using water based emulsions of silicone. The final applications of such a type of paper include packing, storage and restoration.

The technical problems encountered in the prior art and in the research are mainly associated with the improvement in the anchorage of the silicone on the support, in avoiding the inhibition of the cross-linking reaction of silicone and in reducing the quantities of silicone and catalyst (i.e.: Platinum) applied on the support for relevant reasons concerning the cost saving.

In the past, any changes to the siliconizing method, in particular by reducing the quantity of the catalyst used or by use of LTC and fast curing silicones in large amounts, have resulted in difficulties regarding the anchorage of silicone. Actually, it has been observed that the main limiting step for improvement in the siliconizing process concerns the poor anchorage of the silicone on the substrate. Recently, the producers of substrates to be siliconized, tried to solve the anchorage problems by focusing their research in the production of supports able to interact or react with the silicone system; in other words, they tried to convert the fibre support from an inert substrate to an "active" or "reactive" substrate for the silicone.

In order to "activate" the substrate regarding silicone, researchers tried to apply onto the substrate the functional groups involved in the cross-linking reaction of silicone: vinyl, silicone hidryde and silanol functionalities.

Thanks to this approach, the silicone should be able to react not only with itself but with the substrate as well, giving the anchorage to the substrate. It has been demonstrated that this approach should work but this concept came up against difficulties in the production of "activated" substrates and products with such a type of characteristics are not yet available on the market.

Document WO2005/071161 describes a glassine that is coated with standard coating formulations. This cellulose-based support is then functionalized by grafting directly onto it an organic molecule containing a vinylic function and an acid halide function. The hydroxyl functionalities of the substrate react with the acid halide function of the organic molecule to create covalent bonds between them. The chain-terminal vinylic function enables good anchorage and excellent cross-linking of the silicone due to the formation of covalent bonds between the support and the silicone. This siliconizing step of this glassine may also be performed with LTC silicones. The results obtained demonstrate an improvement of the anchorage of silicone on the support.

The grafting reaction reported in document WO2005/071161 can be performed either in an organic solvent process or by applying directly the pure reactant onto the substrate. However, the grafting cannot be carried out in a water based process due to the fact that such a type of organic molecules are very sensitive to water. Actually, the acid halide function (used as reactive function for the grafting reaction) reacts with water to form chemicals that do not react with the substrate. As a result, such a type of organic molecules cannot be used in conventional water-based coating of substrates.

Another drawback concerns the production of acids (hydrochloric acid, hydrobromic acid, etc.) as by-products during the grafting reaction. The formation of volatile and strong acids during the process causes serious problems regarding the safety of the employees, the environmental system and problems of corrosion of the industrial machines.

Although using an organic solvent based process to apply the grafting molecule on the substrate could solve the problems related to the inhibition of the grafting molecule, this approach would significantly increase the problematic aspects related to safety, environmental and corrosive issues.

On the other hand, the coating of the pure grafting molecule directly onto the substrate could solve the problems of inhibition of the reactant, but in this case as well, the man in the art is facing safety and corrosive issues. Moreover, up to now, the technology to apply very low amount of such organic molecules on an industrial machine has been missing.

Document WO2009/147283 describes a glassine that has been coated with a modified compound i.e. a functionalized polymer. In this case, the functionalization is carried out off-line from the industrial machine and the functionalized compound is applied by coating. The functionalization of the compound is carried out by using one of the following grafting functionalities: halogenic alkene, carboxylic acid, acid chloride, acid anhydride or acid ester. Even though the functionalized polymers could be applied onto the substrate by using a water-based process, the grafting reactions cannot be performed in water as solvent.

In fact, in the case of halogeno alkenes or acid chloride as reactive functional groups, they readily react with water to afford functional groups that do not react with the polymer. Another drawback is the production of hydrochloric acid as a by-product during the grafting reaction.

In the case of carboxylic acids, acid anhydride or acid ester as reactive functional groups, the reaction of a chemical containing one of these functional groups with the polymer would lead to the formation of a molecule of water. However, it is well known in organic chemistry that such a type of reactions are reversible and give a chemical equilibrium between reactants and products. If the solvent is water, the equilibrium is mainly shifted to the direction of the reactants (Le Chatelier's principle). As a result, in water, this reaction does not occur or, if it occurs, it affords a very low yield of reaction.

Although the grafting technology reported in these prior art documents are carried out in organic solvents (anhydrous organic solvents in the case of halogenic alkene or acid chloride as reactive functional groups), the use of organic solvents for the grafting reaction presents several disadvantages. In fact, in addition to safety and environmental issues, the cost of the organic solvent based grafting technology is very high due to the multi-steps process required. In particular, the polymer has first to be solubilized in the organic solvent, the solvent is then evaporated at the end of the reaction. The modified polymer can also be precipitated with a non-solvent, the solvent being purified or substituted for the next step, and the obtained grafted polymer solubilized again in water to be then coated on the industrial machine. Such a type of multi-steps process makes the technology not competitive in comparison with the possible benefits in performances of the final product for the silicone.

The problems that the present invention intends to solve relate to an improved support that does not suffer from the drawbacks described in the preceding.

BRIEF DESCRIPTION OF THE INVENTION

The present invention suggests to carry out the grafting of the polymer in water as solvent, and then to coat the functionalized polymers onto the cellulose and/or synthetic fibre substrate by using a water based coating solution. Thanks to the chemistry related to the present invention, the reaction of polymer grafting is carried out in a water based process as well, before the coating on the support. In the present invention, the organic molecule used comprises an epoxy function, optionally in the form of a chloro-hydrin, as reactive functional group for the polymer grafting. In addition to the epoxy functionality, the organic molecule comprises at least one vinylic or one silicone hydride or one silanol functional group. The linkage between the water soluble polymer and the organic molecule depends on the polymer involved in the reaction. The reaction does not form water as by-product of the reaction and it is performed in water as solvent with a high yield of reaction.

The water soluble polymer functionalized with the method reported in the present invention is then coated onto a support based on the cellulose and/or synthetic fibre substrates, using any kind of surface treatment in the industry.

As soon as the functionalized water soluble polymer is applied onto the substrate, vinylic or silicone hydride or silanol functionalities are present on the surface of the substrate. The presence of the vinylic function or silicone hydride or silanol functionality enables the silicone to react with the substrate in the siliconizing stage generating covalent bounds between the silicone layer and the substrate. Thanks to the covalent boundings the adhesion of the silicone layer is significantly improved and no inhibition of the silicone cross-linking has been observed.

The present invention provides to the substrate to be siliconized several improved characteristics obtained by using a safety, environmental friendly and cheap process; representing a significant contribution to the search for sustainable technical and industrial solutions.

The present invention provides a new approach which improves cellulose and/or synthetic fibre-based supports that are intended to be covered with a silicone film. Thanks to the present invention, the fibre-based support is improved by using a complete process that can be solely water based. In fact, a water soluble polymer is modified by a chemical reaction using water as solvent. The resulting grafted water soluble polymer is then coated on a substrate by using any water based methods known to one skilled in coating processes.

The resulting products exhibit an improved cross-linking of the silicone and an enhanced anchorage of the silicone on the substrate as compared to the prior art supports. The improvement of the cross-linking of silicone and the enhancement in silicone anchorage, enables the possibility to reduce the amount of catalyst to be used in the silicone formulation (i.e.: Platinum), to maintain the silicone adhesion properties when the product is subject to severe humid conditions, and also to reduce the curing time of the silicone during the siliconization step (i.e.: it gives the possibility to increase the speed of the siliconizing machines without any arrangements of the industrial machines).

More precisely, the subject matter of the invention concerns a cellulose and/or synthetic fibre-based support of which at least one surface is coated with a layer containing at least one water-soluble polymer comprising hydroxyl or primary-secondary amino functional groups, at least some of which have been functionalized beforehand with at least one organic compound;

wherein said organic compound contains:
at least one epoxy functional group, and
at least one $R^1$ group wherein $R^1$ is a vinyl functional ($CH_2=CH-$) group or at least one $-Si(R^2)_3$ functional group and wherein $R^2$=hydrogen atom, hydroxyl, alkoxy, alkyl, and combinations thereof.

As already said, in the support according to the present invention, the hydroxyl and/or primary-secondary amino functional groups of the water-soluble polymer have been functionalized beforehand with at least one organic compound.

In a preferred embodiment, the epoxy functional group of said organic compound corresponds to a saturated three-membered cyclic ether.

The term cellulose fibre-based support is understood to mean a support that contains cellulose fibres that have been more or less adapted in proportions ranging from 50 to 99% by weight for purposes of their desired characteristics (density, transparency, mechanical properties).

The term synthetic fibre-based support, commonly called nonwoven, is understood to mean as a sheet or web structures bonded together by entangling fibre or filaments by a mechanical, thermal or chemical process. Nonwovens are flat, porous sheets that are made directly from separate fibres (wetlaid process) or from molten plastic particles (spundbound, meltblown or electrospinning processes). Typical fibres used in the production of nonwovens are made of: polyester (for example: polyethylene terephthalate, polybutylene terephthalate, polylactic acid), polyolefines (for example: polypropylene, polyethylene), polyamides (for example: nylon 6, 6-6, 12, 6-12), polyphenylene sulfide, polycarbonate, viscose and fibreglass.

Substrates of cellulosic and synthetic fibres can be produced and adapted in relative proportions ranging from 1 to 99% by weight for purposes of their desired characteristics. For instance, some applications may involve or require the addition of small amounts of synthetic fibres to the cellulose as a reinforcement material.

In a particular embodiment, the support is a cellulose fibre-based support.

The coating layer that contains the functionalized water soluble polymer is designed to afford silicone barrier properties to the surface of the fibre-based support.

Figure 1:
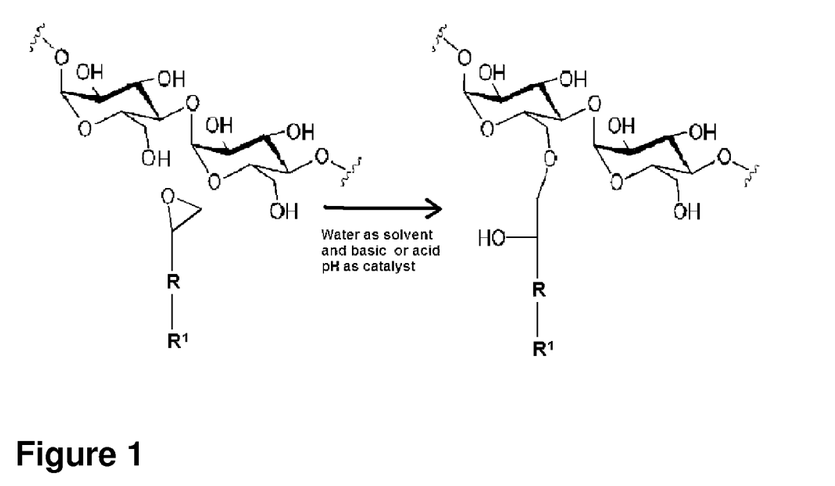
FIG. 1 represents the alkylation reaction, in an aqueous medium at a basic or acid pH, between a water soluble polymer containing hydroxyl functionalities and an organic molecule comprising both an epoxy function and a functional group among, for instance, Si—H, Si—OH, or vinyl. In this particular case, starch is the water soluble polymer containing hydroxyl functionalities while the molecule having an epoxy functionality refers to the general formula: $H_2C-O-CH-(R)-R^1$.

When the water soluble polymer contains hydroxyl functional groups, the linkage between the polymer and the organic molecule is made through an ether bond with a hydroxyl functionality in position 2 (i.e.: 2-hydroxyether) (as in FIG. 1).

Figure 2:
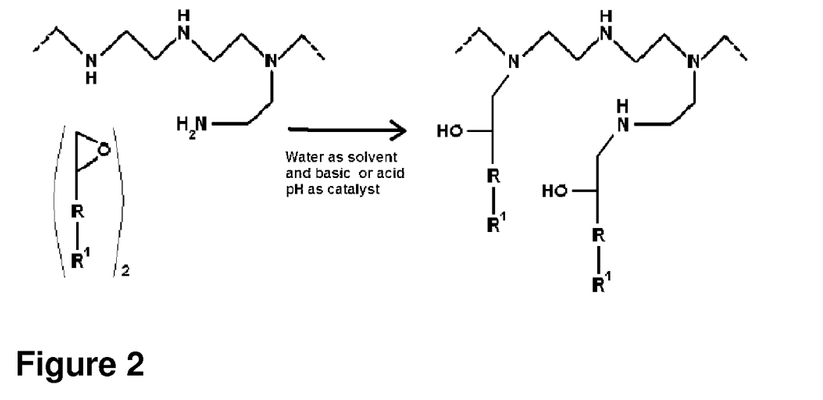
FIG. 2 represents the alkylation reaction, in an aqueous medium at a basic or acid pH, between a water soluble polymer containing primary and/or secondary amino functionalities and an organic molecule comprising both an epoxy function and a functional group among, for instance, Si—H, Si—OH, or vinyl. In this particular case, polyethyleneimine is the water soluble polymer containing primary and secondary amino functionality while the molecule having an epoxy functionality refers to the general formula: $H_2C-O-CH-(R)-R^1$.

When the water soluble polymer contains primary or secondary amino functional groups, the linkage between the polymer and the organic molecule is an alkylated amine (secondary or tertiary amine) with a hydroxyl function in position 2 (i.e.: 2-hydroxyamine) (as in FIG. 2). In a particular embodiment, the water soluble polymer may comprise both hydroxyl and primary-secondary amino functional groups (i.e.: chitosan).

In both cases (OH and NH/$NH_2$ containing polymers), the chemical reaction involved is an alkylation reaction where no other by-products are produced during the reaction (i.e.: water is not produced).

Additionally, the coating layer comprising the water-soluble polymer may contain at least one functionalized water-soluble polymer and at least one water soluble polymer that has not been functionalized. As a result, functionalized and unfunctionalized hydroxyl or amino functional groups may be contained in the same water-soluble polymer, or they may be contained in a mixture of a least two water-soluble polymers comprising different hydroxyl or amino functional groups.

Furthermore, the coating layer that contains the functionalized water-soluble polymer may also contain other water-soluble binders, conventional additives, pigments and latexes. Depending on the nature of the water soluble polymer, a suitable crosslinker can be advantageously added in the formulation in order to render the polymer water insoluble after the application of the polymer on the substrate and the drying of the product. In fact, once the coated support is dried, the water soluble polymer can become water insoluble due to its cross-linking. The skilled man in the art knows that the hydrosoluble properties of a polymer can be affected when a crosslinker is added.

Interestingly, when the organic molecule is not water soluble, the grafting reaction can still occur in water. In fact, by vigorous stirring, it is possible to create an emulsion of the organic molecule in the water solution and the grafting reaction occurs even if the polymer and the reactant are not in the same phase.

In a preferred embodiment of the invention, the water-soluble polymer containing hydroxyl functional groups can advantageously be chosen from the group comprising natural and modified polysaccharides such as starch; CMC (carboxymethyl cellulose); alginate; chitosan, pectine, chtin, glycogen, arabinoxylane, cellulose and synthetic polymers such as poly(vinyl alcohol); hydrolysed or partially hydrolysed copolymers of vinyl acetate, which may be obtained for example by hydrolysing ethylene—vinyl acetate (EVA) or vinyl chloride—vinyl acetate, N-vinyl pyrrolidone—vinyl acetate, and maleic anhydride—vinyl acetate copolymers.

In a preferred embodiment, the water-soluble polymer containing hydroxyl functional groups is advantageously starch.

In another preferred embodiment, the water-soluble polymer containing hydroxyl functional groups is advantageously PVA.

In a preferred embodiment of the invention, the water-soluble polymer containing primary-secondary amino functional groups can advantageously be chosen from the group comprising polyethyleneimine; polyallylamine; chitosan; polyacrylamide; partially or totally hydrolized polyacrylamide; partially or totally hydrolized polyvinylamine, polyamines based on amino-ethyl-piperazine; and in general big molecules containing aliphatic or aromatic polyamino functional groups as for example spermidine, spermine, diethylenetriamine, triethylenetetramine and tetraethylenepentamine. This water-soluble polymer containing amino functionalities is advantageously polyethyleneimine, polyallylamine and parlially or totally hydrolized polyvinylamine.

Typically, the water soluble polymers that are grafted correspond to a molecule containing at least one element from the group of C, H, N, O, non-metals such as the halogens, Si, S, P, metals such as Na, Li, K, Mg, Pb, etc.

The molecular weight of the water soluble polymer comprising primary-secondary amino or hydroxyl functional groups preferably ranges from 1,000 to 1,000,000 a.m.u, advantageously from 50,000 to 150,000 a.m.u.

As already stated, the organic molecule enabling the grafting of the water soluble polymers contains at least one epoxy functionality ($-CH-O-CH_2$) as well as at least one functional group among vinylic ($-CH=CH_2$), silicone hydride (Si—H), and silanol (Si—OH) groups. The epoxy group enables the organic molecule to be grafted onto the water-soluble polymer containing hydroxyl or primary-secondary amino functions by an alkylation reaction.

In the grafting reaction reported in the present invention, the organic molecule can contain, in addition to the epoxy functional group, silanol groups (Si—OH) that are able to react with silicone after siliconizing. It is familiar to one skilled in the art that the silanol functionality can be formed from the hydrolysis of alkoxylated silanols (Si—O—R*, where R* can be a methyl, ethyl, propyl, isopropyl, butyl, isobutyl etc. functionality). The reaction concerns hydrolysis of alkoxylated silanols in water; which can be catalysed in acid or basic pH. This reaction leads to the formation of by products such as alcohols (methanol, ethanol, propanol, isopropanol, butanol, isobutanol etc.). Organic molecules comprising silanol groups resulting from the in situ hydrolysis of alkoxylated silanol groups (Si—OR*) exhibit the same reactivity as organic molecules comprising silanol groups (Si—OH) that therefore do not require any in situ hydrolysis. However, over time, alkoxylated silanols are more stable than silanols, and therefore provide a more convenient raw material reactant for the grafting reaction of the water soluble polymer.

With regards to the polymer grafting reaction involving an alkylation, carrying out the reaction in basic or acidic conditions can catalyze the alkylation. In fact, aqueous acidic conditions can enhance the activation of the oxygen atom of the epoxy group while basic conditions can enhance the activation of the nucleophile that reacts with the epoxy group. Basic pH conditions are usually preferred to the acid conditions since it decreases the eventual formation of side-products (such as dialcohols resulting from the reaction of the epoxy group with water and subsequent inactivation of the organic molecule for the grafting reaction). Moreover, basic pH conditions are preferred due to the nature of some base polymers, such as polysaccharides, which are more stable in basic conditions compared to acid conditions. In fact, in acid pH conditions, polysaccharides can undergo hydrolysis reaction and therefore exhibit different polymer properties, or be definitely damaged.

After the grafting reaction of the water soluble polymer with the organic molecule, such a functionalized water soluble polymer can then be coated onto the fibre-based support using any kind of surface treatment from the coating technology. The coating layer is layered down onto the fibre-based support, thereby producing, in a single and rapid step on the industrial machine, a support exhibiting the desired functionality and a barrier between the silicone and the support.

Therefore, the product produced by the described process presents at the web surface vinylic or silicone hydride or silanol functionalities which enable a better anchorage of the silicone during the subsequent siliconizing step.

For the sake of simplicity, the water-soluble polymer containing hydroxyl or primary-secondary amino functionalities will be referred to by the abbreviation "PH" in the following. The terms "functionalized PH" will be used to denote the products of the reaction between PH and the organic molecule described in the preceding.

The formula of the organic molecule selected to functionalize the water-soluble polymer containing hydroxyl or primary-secondary amino functionalities is advantageously one of the following:

wherein R=linear, branched and/or cyclic carbon $—(C)_x—$ chain or a polydimethylsiloxane chain $(—O—Si(CH_3)_2—)_y$ or the combination of the two $(—C—)_z—(—O—Si(CH_3)_2—)_j$ chains that may also contains heteroatoms (X) as part of the chain structure —C—X—C— or as side group of the chain structure —C(X)—;

and wherein $R^2$=hydroxyl (—OH); hydrogen atom (H); alkyl; alkoxy such as for example methoxy (—O—$CH_3$), ethoxy (—O—$CH_2$—$CH_3$), propyoxy (—O—$CH_2$—$CH_2$—$CH_3$)); and combinations thereof.

In a preferred embodiment, x is comprised between 1 and 25, and more advantageously between 5 and 12.

In a preferred embodiment, y is comprised between 1 and 15, and more advantageously between 1 and 8.

In a preferred embodiment, z is comprised between 1 and 15, and more advantageously between 1 and 8.

In a preferred embodiment, j is comprised between 1 and 15, and more advantageously between 1 and 8.

In the two formulae above, "C—O—C" represents a saturated three-membered cyclic ether.

In a preferred embodiment, the —$Si(R^2)_3$ group can be chosen from the group comprising —$Si(OH)_3$, —$Si(OH)_2$($CH_3$), —$Si(OH)(CH_3)_2$, —$Si(H)(CH_3)_2$, —$Si(H)_2(CH_3)$, —$SiH_3$, —$Si(O\ R^3)_3$, —$Si(O\ R^3)_2(CH_3)$, —$Si(O\ R^3)(CH_3)_2$, wherein $R^3$ are groups chosen from —$CH_3$, —$CH_2$—$CH_3$, —$(CH_2)_2$—$CH_3$, —$CH(CH_3)_2$, —$(CH_2)_3$—$CH_3$, —$CH_2$—$CH(CH_3)_2$, —$(CH_2)_4$—$CH_3$, —$(CH_2)_2$—$CH(CH_3)_2$, —$C_6H_6$ and combinations thereof.

In a preferred embodiment of the invention, the organic molecules used for the grafting reaction of the water soluble polymer can be preferably one of the following compounds: 2-vinyloxyrane, 1,2-epoxy-4-pentene 1,2-epoxy-5-hexene, 1,2-epoxy-6-heptene, 1,2-epoxy-7-octene, 1,2-epoxy-8-nonene, 1,2-epoxy-9-decene, 1,2-epoxy-10-undecene, 1-allyloxy-2,3-epoxypropane, 1-allyloxy-3,4-epoxybutane, 1-allyloxy-2,3-epoxypentane, 1-allyloxy-2,3-epoxyhexane, 1-allyloxy-2,3-epoxyheptane, 1-allyloxy-2,3-epoxyoctane, 1-allyloxy-2,3-epoxynonane, 1-allyloxy-2,3-epoxydecane, 1-allyloxy-2,3-epoxyundecane, glycidoxypropyl trimethoxysilane, glycidoxypropyl triethoxysilane, glycidoxypropyl trisiloxane.

Said organic molecule is advantageously 1,2-epoxy-9-decene or 1-allyloxy-2,3-epoxypropane.

In a preferred embodiment, said organic molecule represents between 0.1% and 20% by weight of the weight of the PH, more advantageously between 0.1% and 10% and even more advantageously between 0.1% and 5%. Even more advantageously, the organic molecule represents 1% by weight of the weight of the PH. The control of the grafting rate thus enables the silicone anchorage to be controlled afterwards, and this is assisted by the presence of the vinylic or silicone hydride or silanol functionality.

The functionalized PH preferably accounts for at least 1% by weight of the layer coated onto the cellulose and/or synthetic fibre-based support, advantageously at least 5%, and even more advantageously between 20 and 100%.

The cellulose layer that forms the support according to the invention typically exhibits a weight ranging from 30 to 160 g/m², preferably from 55 to 140 g/m², and most advantageously in the order of 58 g/m². In a particular embodiment, the weight of the support corresponds to the weight of the fibres. At least one surface of this support is coated with the described coating layer in a quantity of 0.2 to 20 g/m², preferably 1 g/m².

The support according to the present invention may be prepared by the following method:

formation of a cellulose and/or synthetic fibre-based sheet; with or without a parchementizing process.

functionalization of at least one water soluble polymer comprising hydroxyl or primary-secondary amino functional groups, by grafting at least one organic molecule comprising at least one epoxy group and at least one $R^1$ functional group wherein $R^1$ can be chosen from a vinyl group, or at least one —$Si(R^2)_3$ functional group and wherein $R^2$=hydrogen atom, hydroxyl, alkoxy, alkyl, and combinations thereof. Said organic molecule is able to form covalent bonds with the hydroxyl or primary-secondary amino functional groups of the PH.

coating the cellulose and/or synthetic fibre support, by methods known to one skilled in the art, with at least one functionalized PH; this step will advantageously be carried out at a temperature between 20 and 95° C., preferably between 50 and 70° C.

calendering or supercalendering the support if required.

In a particular embodiment of the invention, a chloro-hydrin compound can be used as precursor of the organic molecule. Indeed, the chloro-hydrin compound reacts in basic conditions to form an epoxy compound. The water soluble polymer is therefore still grafted with a molecule containing an epoxy functional group. The conversion from the chloro-hydrin functional group to the epoxy group can be carried out before or during the grafting reaction.

Still according to this particular embodiment, an organic molecule comprising an epoxy group can be obtained from a compound containing a chloro-hydrin group, in aqueous alkaline conditions. In fact, the chloro-hydrin easily reacts with water in alkaline conditions. However, it can be converted to epoxy and therefore be "activated" by a pre-chemical reaction. The chloridric acid which is a by-product of this pre-reaction and it can be converted to a salt (for example sodium chloride, thanks to the alkaline conditions obtained by the addition of sodium hydroxide). The organic molecule comprising an epoxy group and obtained from the chloro-hydrin precursor exhibits the same reactivity as an organic molecule comprising an epoxy group that does need to be pre-activated. The chloro-hydrin precursor can be advantageous in that it is more chemically stable over time and it exhibits lower toxicity as compared to epoxy compounds.

According to a preferred method, the PH is functionalized at a temperature between 20 and 95° C., preferably between 80 and 95° C., in aqueous phase, and eventually in the presence of an organic or an inorganic acid or base as catalyst. In fact, adding an organic or an inorganic acid or base may be necessary when the PH is not already acidic or basic.

Coating techniques known to one skilled in the art further include size-press, metering-size-press, foulard coating, rod coating, "Champion" bar coating, "Meyer" bar coating, air-knife coating, gravure coating, scraper blade coating, sliding blade coating, single- and multilayer curtain coating, reverse roll coating, spray coating, atomisation coating, liquid application system (LAS) coating, kiss coating, foam coating, and any surface coating application process.

The present invention relates as well to a cellulose and/or synthetic fibre-based support of which at least one surface is coated with a layer containing at least one water-soluble polymer comprising hydroxyl or primary-secondary amino functional groups, at least some of which have been functionalized beforehand or after the step of coating with at least one organic compound. Said organic compound contains:
  at least one epoxy functional group, and
  at least one $R^1$ group wherein $R^1$ is a vinyl group or at least one $Si-(R^2)_3$ functional group and wherein $R^2$=hydrogen atom, hydroxyl, alkoxy, alkyl, and combinations thereof.

Additionally, the present invention concerns the process associated to this support.

Generally, a cellulose and/or synthetic fibre-based support according to the invention will be treated in a siliconizing step for use in supports, for instance, for self-adhesive labels, adhesive tapes and vegetable parchment for example. It will be siliconized by any of the methods known to one skilled in the art.

In general, the present invention consists in the functionalization of a water soluble polymer containing amino or hydroxyl functional groups with a molecule having an epoxy function by using a water based process, and in applying the functionalized polymer on a cellulose and/or synthetic fibre-based support by a water based coating technique. The present invention is in contrast to the prior art; which consisted in grafting a molecule directly (or dissolved in organic solvents) onto the cellulosic support or in the pre-grafting a molecule on a polymers using reactions in organic solvents and then coating the resulting grafted polymers on the cellulosic substrate.

EXEMPLARY EMBODIMENTS OF THE INVENTION

The invention itself and the advantages that it offers will be explained in greater detail in the following description of exemplary embodiments and with reference to the following figures.

EXAMPLES

Method for Preparing the Glassine According to the Invention:

A sheet consisting of 100% cellulose fibres is prepared by methods known to one skilled in the art. The support used in the examples is the commercial product Silca Classic Yellow 59 g/m² (from Ahlstrom); for the production of the samples described in the examples, the support has not been coated with the standard formulation but with the formulations reported in the examples 1 and 2. In the case of the standard paper, the commercial grade Silca Classic Yellow has been used as such.

Off-line from the industrial machine, the water soluble polymer containing primary-secondary amino or hydroxyl functionalities is functionalized with an organic molecule by using the methods of examples 1 and 2. After the functionalization reaction, the polymer solution can be mixed with other products commonly used in this application (for example: clays, pigments, latexes, polymers and/or additives), diluted with water to the desired solid content and sent to the industrial machine for the coating step.

The mixture containing the functionalized water soluble polymer is then applied to a surface of the support by coating (1 g/m²), preferably by metering-size-press.

The support is then dried, remoisturized, and super-calandered.

Example 1

Functionalization Reaction of a Water Soluble Polymer Containing Primary and/or Secondary Amino Functionalities and Preparation of the Coating Recipe In the present example, polyethyleneimine is the polymer containing primary and/or secondary amino functionalities since it contains both functionalities on the same polymer structure.

The commercial polyethyleneimine Polymin P (from Basf) is delivered as a water solution with a solid content of 50% w/w. In order to decrease the viscosity of the solution, Polymin P is diluted with water at a solid content of 20%. For the grafting reaction, an amount of 2% w/w of pure 1,2-epoxy-9-decene (from Sigma-Aldrich), compared to the weight of dry Polymin P, is slowly added to the polymer solution under vigorous stirring. The organic molecule 1,2- epoxy-9-decene is a liquid which is not soluble in water, so a vortex is required to create an emulsion of 1,2-epoxy-9-decene in the polymer solution, forming a cloudy solution. Due to the fact that Polymin P in solution already has a pH between 11 and 13, the addition of a base in order to increase the pH to catalyze the reaction is not required. The solution is heated to 90° C. and maintained at this temperature under stirring for one hour. Subsequently, the pH of the solution is neutralized by addition of a water solution of sulphuric acid. Afterwards, 20% w/w of CMC and 5% w/w of glyoxal compared to the weight of Polymin P are added to the solution. The solution is then diluted with water to a final solid content of 8% w/w. Finally, the solution is transferred to the coating apparatus for the coating step. CMC is added in the coating formulation as a viscosity modifier to improve the film forming properties and the water retention of the coating formulation. Glyoxal is added as a cross-linking agent for the coating formulation.

Example 2

Functionalization Reaction of a Water Soluble Polymer Containing Hydroxyl Functionalities and Preparation of the Coating Recipe In the present example, PVA, Celvol 20/99 (Celanese), is the representative polymer containing hydroxyl functionalities. Celvol 20/99 is delivered as a powder. A dispersion of PVA is produced in water by vigorous stirring. It is then heated up to 95° C. in order to completely dissolve PVA in water. A clear solution with a solid content of 12% is obtained. A solution of sodium hydroxide is added to the PVA solution in order to reach a pH value between 11 and 13. For the grafting reaction, an amount of 2.5% w/w of pure 1,2-epoxy-9-decene (from Sigma-Aldrich), compared to the weight of dry Polymin P, is slowly added to the polymer solution under vigorous stirring. The organic molecule 1,2-epoxy-9-decene is a liquid which is not soluble in water, so a vortex is required to create an emulsion of 1,2-epoxy-9-decene in the polymer solution, forming a cloudy solution. The solution is heated to 90° C. and maintained at this temperature under stirring condition for three hours. Subsequently, the pH of the solution is neutralized by addition of a water solution of sulphuric acid. Afterwards, 10% w/w of CMC and 5% w/w of glyoxal compared to the weight of PVA are added to solution. The solution is then diluted with water to afford a final solid content of 8% w/w. Finally, the solution is transfered to the coating apparatus for the coating step.

Example 3

Silicone Anchorage of Low Temperature Curing (LTC) Silicone Systems

Standard glassine (STD) and the glassine produced by the methods reported in examples 1 (EX1) and 2 (EX2) have been siliconized with LTC silicones. The silicone anchorage results have been compared. In order to assess the silicone anchorage, a standard test called rub-off test has been performed; this test is an abrasion test in which a sample of siliconized paper, pressed under a weight, is dragged on an abrasive textile. The silicone layer at the surface of the sample can be removed by the rubbing. By measuring the amount of silicone onto the samples before and after the rubb-off test, it is possible to obtain a percentage of silicone that remains on the samples. The rub-off percentage 0% indicates that all the silicone has been removed from the sample, very poor adhesion; the rubb-off percentage 100% indicates that all the silicone remained on the sample, the adhesion is ideal. For the release application, the rub-off value of 75% is commonly considered as the bottom limit for silicone ancohorage. The following silicone formulation has been used in this example:
LTC Silicone Formulation Bath:
Polymer: D920 (from Wacker)—18.07 g
Cross-linking agent: XV 525 (from Wacker)—1.43 g
Catalyst: C05 (i.e.: Platinum based from Wacker)—2.14 g
Deposit: 0.9 g/m$^2$
Cross-linking for 30 seconds at 80° C. in a ventilated drying kiln Table 1 shows that STD has a rub-off value of 18% (very poor adhesion of the silicone), whereas EX1 and EX2 have respectively rub-off values of 96% and 97% (both samples have very good adhesion properties for LTC silicone systems). So, in the case of standard glassine the LTC silicone cannot be used due to the poor adhesion of the silicone system to the substrate; on the contrary, LTC silicone systems can be used on glassine produced by the methods reported in the present invention.

TABLE 1

| Sample | STD | EX1 | EX2 |
| --- | --- | --- | --- |
| Rub-off value | 18% | 96% | 97% |

Example 4

Silicone Anchorage Dependence on the Amount of Catalyst (i.e.: Platinum) in the Silicone Formulation For thermal cured silicone systems used in release industry, the catalyst used is an organometallic compound of platinum. Due to the high price of platinum, there is a strong interest in reducing its amount in the silicone formulation. The first problem observed when a reduced amount of catalyst is used is a poor anchorage of the silicone to the substrate.

Standard glassine (STD) and the glassine produced by the methods reported in examples 1 (EX1) and 2 (EX2) have been siliconized with a standard silicone formulation by using two different amounts of catalyst in the silicone formulation, and the silicone anchorage on different substrates has been tested. In order to evaluate the silicone anchorage, the rub-off test (described in example 3) has been performed. For the tests the following silicone formulations have been used:
Standard Silicone Formulation Bath:
Polymer: 11367 (from Bluestar)—50 g
Cross-linking agent: 12031 (from Bluestar)—2.9 g
Catalyst (60 ppm Platinum): 12070 (from Bluestar)—1.56 g; or (30 ppm Platinum): 12070-0.78 g
Deposit: 0.9 g/m$^2$
Cross-linking for 10 seconds at 160° C. in ventilated drying kiln As it is possible to observe in table 2, an satisfactory rate of silicone anchorage is obtained for all samples when the silicone formulation contains 60 ppm of platinum. On the contrary, when the amount of platinum is decreased to 30 ppm, the silicone anchorage of samples EX1 and EX2 remains very good but the anchorage of STD is poor.

TABLE 2

|  | STD | EX1 | EX2 |
|---|---|---|---|
| Rub-off (60 ppm of Platinum) | 90% | 95% | 98% |
| Rub-off (30 ppm of Platinum) | 54% | 91% | 93% |

The invention claimed is:

1. A method for producing a coated cellulose and/or synthetic fibre-based support which comprises a cellulose and/or synthetic fiber-based support sheet and a coating layer on at least one surface of the support sheet, wherein the method comprises the steps of:
   (a) forming a cellulose and/or synthetic fibre-based support sheet with or without a parchementizing process;
   (b) functionalizing at least one water-soluble polymer comprising hydroxyl or primary-secondary amino functional groups by grafting at least one organic molecule comprising at least one epoxy group and at least one $R^1$ functional group onto the water-soluble polymer, wherein $R^1$ is a vinyl group or at least one —Si($R^2$)$_3$ functional group, where $R^2$ is selected from the group consisting of hydrogen, hydroxyl, alkoxy, alkyl, and combinations thereof;
   (c) coating the cellulose and/or synthetic fibre-based support sheet obtained according to step (a) with a layer comprising the at least one functionalized water-soluble polymer obtained according to step (b) to obtain the coated cellulose and/or synthetic fibre-based support; and
   (d) optionally calendering or supercalendering the coated cellulose and/or synthetic fibre-based support.

2. The method as recited in claim 1, wherein the organic molecule is prepared from a chloro-hydrin precursor.

3. The method as recited in claim 1, wherein the water-soluble polymer is functionalized according to step (b) at a temperature between 20 and 95° C. in an aqueous medium and in the presence of an organic or inorganic acid or base.

4. The method as recited in claim 1, wherein step (c) is practiced by a coating technique selected from the group consisting of size-press coating, metering-size-press coating, foulard coating, rod coating, "Champion" bar coating, "Meyer" bar coating, air-knife coating, gravure coating, scraper blade coating, sliding blade coating, single- and multilayer curtain coating, reverse roll coating, spray coating, atomisation coating, liquid application system (LAS) coating, kiss coating, and foam coating.

5. The method as recited in claim 1, wherein the coating of the cellulose and/or synthetic fibre-based support according to step (c) is carried out at a temperature between 20 and 95° C.

6. The method as recited in claim 1, wherein the at least one organic compound is grafted onto the water-soluble polymer via the at least one epoxy functional group by an alkylation reaction.

* * * * *